US012129713B2

(12) United States Patent
Kim

(10) Patent No.: US 12,129,713 B2
(45) Date of Patent: Oct. 29, 2024

(54) ROLLER BLIND DRIVE DEVICE OPERATED BY SINGLE PULL CORD

(71) Applicant: Sangik Kim, Daegu (KR)

(72) Inventor: Sangik Kim, Daegu (KR)

( * ) Notice: Subject to any disclaimer, the term of this patent is extended or adjusted under 35 U.S.C. 154(b) by 285 days.

(21) Appl. No.: 17/850,208

(22) Filed: Jun. 27, 2022

(65) Prior Publication Data

US 2023/0392441 A1 Dec. 7, 2023

(30) Foreign Application Priority Data

Jun. 3, 2022 (KR) ........................ 10-2022-0068025

(51) Int. Cl.
*E06B 9/78* (2006.01)
*E06B 9/42* (2006.01)

(52) U.S. Cl.
CPC . *E06B 9/78* (2013.01); *E06B 9/42* (2013.01)

(58) Field of Classification Search
CPC ..... E06B 9/78; E06B 9/42; E06B 9/08; E06B 9/40; E06B 9/56; E06B 2009/785
See application file for complete search history.

(56) References Cited

U.S. PATENT DOCUMENTS 1,235,451 A * 7/1917 Evans ........................ E06B 9/42 160/300
1,746,936 A * 2/1930 Hadden ..................... E06B 9/78 160/307
3,934,832 A * 1/1976 Zilver ........................ E06B 9/78 242/406
4,476,910 A * 10/1984 Saito ......................... E06B 9/90 160/291
5,791,393 A * 8/1998 Judkins ................... E06B 9/326 160/84.05
6,112,800 A 9/2000 Marusak
(Continued)

FOREIGN PATENT DOCUMENTS

CN 209469350 U 11/2018
JP 2017198021 A 11/2017
(Continued)

OTHER PUBLICATIONS

Office Action of ISEDC for Canadian application No. 3,165,872, issued on Sep. 14, 2023.
(Continued)

*Primary Examiner* — Johnnie A. Shablack
(74) *Attorney, Agent, or Firm* — NKL Law; Byungwoong Park

(57) ABSTRACT

Proposed is a roller blind drive device operated by a single pull cord which lowers or raises a curtain fabric by performing forward/reverse rotation of a drum, on which the curtain fabric is wound, by only the single pull cord, the drive device including a drive casing disposed fixedly on one side of the drum, a drive manipulation part mounted rotatably inside the drive casing and connected with the pull cord, and a drum control part mounted rotatably on an outer part of the drive casing and configured to receive a rotational force from the drive manipulation part and rotate the drum, the drum control part being configured to hold the drum or rotate the drum reversely when the rotational force of the drive manipulation part is blocked.

14 Claims, 13 Drawing Sheets

(56) References Cited

U.S. PATENT DOCUMENTS

| | | | | |
|---|---|---|---|---|
| 6,142,211 | A * | 11/2000 | Judkins | E06B 9/90<br>160/319 |
| 7,128,126 | B2 * | 10/2006 | Smith | E06B 9/262<br>160/84.05 |
| 7,380,582 | B1 * | 6/2008 | Anderson | E06B 9/34<br>248/267 |
| 7,578,334 | B2 * | 8/2009 | Smith | E06B 9/42<br>160/84.05 |
| 7,665,507 | B2 * | 2/2010 | Naoki | E06B 9/78<br>160/170 |
| 8,186,413 | B2 * | 5/2012 | Fujita | E06B 9/34<br>160/319 |
| 8,191,605 | B2 * | 6/2012 | Kwak | E06B 9/42<br>160/319 |
| 8,356,653 | B2 * | 1/2013 | Fu-Lai | E06B 9/322<br>160/84.05 |
| 8,844,605 | B2 * | 9/2014 | Ng | E06B 9/78<br>192/81 C |
| 8,851,143 | B2 * | 10/2014 | Zhu | E06B 9/38<br>160/121.1 |
| 9,341,020 | B1 * | 5/2016 | Kao | E06B 9/262 |
| 9,482,050 | B2 * | 11/2016 | Strand | E06B 9/50 |
| 9,765,864 | B2 * | 9/2017 | Yu | E06B 9/78 |
| 9,890,588 | B2 * | 2/2018 | Smith | E06B 9/26 |
| 10,407,983 | B2 * | 9/2019 | Holt | F16H 3/66 |
| 11,492,845 | B2 * | 11/2022 | Cheng | E06B 9/262 |
| 11,859,447 | B2 * | 1/2024 | Brown | E06B 9/06 |
| 11,927,058 | B2 * | 3/2024 | Lee | E06B 9/90 |
| 2006/0191650 | A1 * | 8/2006 | Takebayashi | E06B 9/78<br>160/320 |
| 2014/0216668 | A1 * | 8/2014 | Kim | E06B 9/42<br>160/322 |
| 2016/0281423 | A1 * | 9/2016 | Kao | E06B 9/42 |
| 2023/0025616 | A1 * | 1/2023 | Lee | E06B 9/88 |
| 2024/0117674 | A1 * | 4/2024 | Wang | E06B 9/42 |

FOREIGN PATENT DOCUMENTS

| | | | |
|---|---|---|---|
| KR | 10-0875633 | B1 | 12/2008 |
| KR | 102071941 | B1 | 1/2020 |
| WO | 2008094720 | A1 | 1/2008 |

OTHER PUBLICATIONS

KIPO Office Action for KR 10-2022-0068025, issued on Sep. 23, 2022.

UK Office Action mailed on Dec. 22, 2022.

* cited by examiner

ROLLER BLIND DRIVE DEVICE OPERATED BY SINGLE PULL CORD

CROSS REFERENCE TO RELATED APPLICATION

The present application claims priority to Korean Patent Application No. 10-2022-0068025, filed Jun. 3, 2022, the entire contents of which are incorporated herein for all purposes by this reference.

BACKGROUND OF THE INVENTION

Field of the Invention

The present disclosure relates generally to a roller blind drive device in which a curtain fabric is lowered or raised by forward/reverse rotation of a drum, on which the curtain fabric is wound, performed by only a single pull cord. More particularly, the present disclosure relates to a roller blind drive device operated by a single pull cord in which a drive manipulation part which transmits a unidirectional rotational force to a drum control part is simply configured to have only a one-stage clutch structure, thereby reducing labor required for manufacturing, and opposite ends of a roller protrusion part which allow radial inward and outward movements of the drive rollers to be performed while the roller protrusion part revolves the drive rollers are configured to be inclined, and roller teeth are formed on the outer surface of a drive connector which comes into close contact with the drive rollers, thereby preventing slipping between the drive rollers and the drive connector overall and facilitating control of the curtain fabric.

Description of the Related Art

Generally, a roller blind is configured such that a curtain fabric which blocks light is wound on a drum, and the curtain fabric is lowered or raised according to forward/reverse rotation of the drum.

That is, a drive device which transmits forward/reverse rotational force generated by a user to the drum is provided on one side or each of opposite sides of the roller blind.

Such a drive device is basically composed of a pulley connected to the drum so as to rotate same, and a pull cord connected to the pulley so as to receive a rotational force from a user.

Generally, the pull cord connected to the pulley is made in a circular closed type of pull cord, and includes two pull cord strands hanging on the pulley in a loop type toward the lower side of the roller blind.

That is, when a user pulls down one cord strand, the drum is rotated forward and the curtain fabric is lowered, but when a user pulls down the other cord strand, the drum is rotated reversely and the curtain fabric is raised.

As for such a roller blind, two cord strands are connected to each other in a loop type, and unless otherwise indicated, it is impossible to know which strand is responsible for forward/reverse rotation, which causes inconvenience.

In addition, for the convenience of a user's manipulation, the cords are extending up to the lower part of a window by having a relatively long length, and thus when the window is opened, the curtain fabric flaps due to the outside air.

Particularly, there is a serious problem that the pull cord may be wrapped around a person's body due to the intention of a user or the carelessness of children, which may lead to death.

DOCUMENT OF RELATED ART (Patent Document 1) Korean Patent No. 10-1437853 Invention Title: Roller blind for preventing child accident

SUMMARY OF THE INVENTION

Accordingly, the present disclosure has been made keeping in mind the above problems occurring in the related art, and the present disclosure is intended to propose a roller blind drive device operated by a single pull cord in which a drive manipulation part which transmits a unidirectional rotational force to a drum control part is simply configured to have a one-stage clutch structure such that man-hours required for manufacturing can be reduced.

In addition, the present disclosure is intended to propose a roller blind drive device in which opposite ends of a roller protrusion part which allows radial inward and outward movements of the drive rollers to be performed while the roller protrusion part revolves the drive rollers are configured to be inclined, and thus the roller protrusion part pushes drive rollers such that the radial inward and outward movements of the drive rollers are performed according to the clockwise/counterclockwise rotation of the drive rollers, thereby facilitating power transmission between the drive guide and the drive rollers.

Furthermore, the present disclosure is intended to propose a roller blind drive device operated by a single pull cord in which roller teeth are formed on the outer surface of a drive connector which comes into close contact with the drive rollers, and the drive rollers are engaged with the roller teeth, thereby preventing slipping between the drive rollers and the drive connector.

Additionally, the present disclosure is intended to propose a roller blind drive device operated by a single pull cord in which a guide wing which comes into contact with a drive casing is formed on the outer surface of the drive guide, and a predetermined resistance is applied to forward revolutions of the drive rollers, thereby facilitating the radial inward movements of the drive rollers along a guide groove part.

In order to achieve the above objectives, according to one aspect of the present disclosure, there is provided a roller blind drive device operated by a single pull cord which lowers or raises a curtain fabric by performing forward/reverse rotation of a drum 3, on which the curtain fabric 2 is wound, by only the single pull cord 1, the drive device including: a drive casing 10 disposed fixedly on one side of the drum 3; a drive manipulation part 20 mounted rotatably inside the drive casing 10 and connected with the pull cord 1 such that the drive manipulation part 20 transmits only a forward rotational force generated by pulling the pull cord 1 to the drum 3 and winds the pull cord 1 such that the pull cord 1 is returned to a raised position; and a drum control part 30 mounted rotatably on an outer part of the drive casing 10 and configured to receive a rotational force from the drive manipulation part 20 and rotate the drum 3, the drum control part 30 being configured to hold the drum 3 or rotate the drum 3 reversely when the rotational force of the drive manipulation part 20 is blocked.

In this case, the drive casing 10 according to the present disclosure may include: a fixed casing 11 supporting the drive manipulation part 20 and the drum control part 30 such that the drive manipulation part 20 and the drum control part 30 are rotatable; a casing cover 12 which is mounted on one side of the fixed casing 11 and restrains the drive manipulation part 20 inside the fixed casing 11 such that the drive manipulation part 20 is rotatable; a closing cover 13 which is mounted on one side of the casing cover 12 and covers the casing cover 12 such that the drive manipulation part 20 is hidden; a passage cover 14 which is inserted into and mounted on a lower side of the fixed casing 11 and covers the lower side of the fixed casing 11 such that the pull cord 1 passes inside and outside of the fixed casing 11; and a protective sleeve 15 which is inserted into and mounted to a center of the passage cover 14 and guides the pull cord 1 such that the pull cord 1 slips into and out of the fixed casing 11.

In addition, the fixed casing 11 according to the present disclosure may include: a casing body 11*a* having an open side surface which has space to receive the drive manipulation part 20 therein and has a passage having a predetermined size provided on a lower side of the casing body 11*a* such that the pull cord 1 passes inside and outside of the casing body 11*a;* a cover protrusion part 11*b* which protrudes on each of lower opposite sides of the casing body 11*a* and has a slot in which the passage cover 14 is slidably inserted into and mounted; a drive shaft 11*c* which protrudes by a predetermined length on a center of the casing body 11*a* and is inserted into and supports the drive manipulation part 20 such that the drive manipulation part 20 is rotatable; a spring protrusion part 11*d* which protrudes on a side portion of an outer surface of the drive shaft 11*c,* and induces a drive spring 22 to be held in the spring protrusion part 11*d* such that elastic energy is accumulated in the drive manipulation part 20; and a drum shaft 11*e* which protrudes by a predetermined length on a center of the drive shaft 11*c* and is inserted into and supports the drum control part 30 such that the drum control part 30 is rotatable.

Furthermore, the drive manipulation part 20 according to the present disclosure may include: a drive wheel 21 which is mounted rotatably to an inner center of the drive casing 10 and allows the pull cord 1 wound on the drive wheel 21 such that the drive wheel 21 receives a forward rotational force from a user; a drive spring 22 which is located between the drive casing 10 and the drive wheel 21 to be connected and mounted thereto, the drive spring 22 being configured to wind the pull cord 1 by rotating the drive wheel 21 reversely; a drive connector 23 which is mounted rotatably to the inner center of the drive casing 10 and is connected to the drum control part 30 so as to transmit a forward rotational force of the drive wheel 21 thereto; drive rollers 24 which are disposed radially between the drive wheel 21 and the drive connector 23 and are selectively engaged with the drive connector 23 while revolving outside of the drive connector 23 along the drive wheel 21 so as to transmit a forward rotational force to the drive connector 23; and a drive guide 25 which receives forward rotational resistance and is rotatably mounted to the inner center of the drive casing 10, the drive guide 25 being configured to guide each of the drive rollers 24 such that the drive rollers 24 are radially moved inward toward and outward from the drive connector 23 while the drive guide 25 rotates along the drive rollers 24.

Additionally, the drive wheel 21 according to the present disclosure may include: a drive wheel body 21*a* having an outer diameter such that the drive wheel body 21*a* is mounted in the drive casing 10, and an inner diameter such that the drive wheel body 21*a* receives the drive connector 23; a spring receiving recess 21*b* being recessed in a first side of the drive wheel body 21*a* by having predetermined diameter and depth so as to receive the drive spring 22; a spring protrusion part 21*c* which protrudes on a side portion of the spring receiving recess 21*b* and induces the drive spring 22 to be held in the spring protrusion part 21*c* such that elastic energy is accumulated in the drive spring 22; and roller protrusion parts 21*d* respectively having arc shapes which are disposed on a second side of the drive wheel body 21*a* by protruding therefrom such that the roller protrusion parts 21*d* are disposed at intervals at which the drive rollers 24 are disposed therebetween while the roller protrusion parts 21*d* cover an outer surface of the drive connector 23, the roller protrusion parts 21*d* allowing the drive rollers 24 to perform radial inward and outward movements while the roller protrusion parts 21*d* revolve the drive rollers 24.

In addition, opposite ends of each of the roller protrusion parts 21*d* according to the present disclosure may be formed to be inclined respectively at predetermined angles such that the roller protrusion parts 21*d* push the drive rollers 24 so as to allow the drive rollers 24 to be radially moved inward and outward while the roller protrusion parts 21*d* revolve the drive rollers 24.

Furthermore, according to the present disclosure, a first end of the roller protrusion part 21*d* may be configured to be inclined at an angle at which an outer portion of the drive roller 24 relative to a center C of the drive roller 24 is in contact with the first end of the roller protrusion part 21*d* such that the drive roller 24 presses the drive connector 23, and a second end of the roller protrusion part 21*d* may be configured to be inclined at an angle at which an inner portion of the drive roller 24 relative to the center C of the drive roller 24 is in contact with the second end of the roller protrusion part 21*d* such that the drive roller 24 is raised outward from the drive connector 23.

Additionally, according to the present disclosure, the drive connector 23 may include: a connector body 23*a* having an inner diameter such that the connector body 23*a* receives an inner center portion of the fixed casing 11 and having an outer diameter and a length such that the connector body 23*a* is inserted into each of the drive wheel 21 and the drum control part 30; roller teeth 23*b* being disposed on an outer surface of a first side of the connector body 23*a* by protruding therefrom at intervals at which the roller teeth 23*b* are engaged with the drive rollers 24 such that slipping between the drive rollers 24 and the drive connector 23 is prevented; and connection teeth 23*c* being disposed on an outer surface of a second side of the connector body 23*a* by protruding therefrom at predetermined intervals such that the drive connector 23 is inserted into the drum control part 30 to be engaged therewith.

In addition, according to the present disclosure, the drive guide 25 may include: a guide body 25*a* having an outer diameter such that the guide body 25*a* is mounted inside the drive casing 10 and an inner diameter larger than a circumference on which the drive rollers 24 are arranged; a guide groove part 25*b* being arranged to have a predetermined shape in an inner surface of the guide body 25*a* by being recessed therefrom according to a number of the arranged drive rollers 24, the guide groove part 25*b* being configured to guide each of the drive rollers 24 such that the drive roller 24 is radially moved inward toward or outward from the drive connector 23 according to a direction of revolution of the drive roller 24; a guide protrusion part 25*c* being disposed on a side surface of the guide body 25*a* by protruding outward therefrom, the guide protrusion part 25*c* being configured to be engaged with the drive casing 10 and support the guide body 25*a* such that the guide body 25*a* is rotatable along the revolution of the drive roller 24; and a guide wing 25*d* being disposed on an outer surface of the guide body 25*a* by protruding therefrom toward a forward rotational direction, the guide wing 25*d* being configured to be in close contact with the drive casing 10 to apply a predetermined resistance to a forward revolution of the drive roller 24 and guide the drive roller 24 such that the drive roller 24 radially moves inward toward the drive connector 23 along the guide groove part 25*b*.

Furthermore, according to the present disclosure, the guide groove part 25*b* may include: a pressing surface 25*b*-1 being recessed at a first side of the guide groove part 25*b* directed in the forward rotational direction to have a depth smaller than a radius of the drive roller 24 such that the drive roller 24 presses the drive connector 23; a spacing surface 25*b*-2 being recessed at a second side of the guide groove part 25*b* directed in a reverse rotational direction to have a depth greater than or equal to the radius of the drive roller 24 such that the drive roller 24 is spaced apart outward from the drive connector 23; and a moving surface 25*b*-3 being recessed to have a tangential grade between the pressing surface 25*b*-1 and the spacing surface 25*b*-2 such that the drive roller 24 slides between the pressing surface 25*b*-1 and the spacing surface 25*b*-2.

In addition, according to the present disclosure, the drive guide 25 may further include: an avoidance groove part 25*e* which is recessed to have a predetermined size in the outer surface of the guide body 25*a* facing the guide wing 25*d* and allows bending of the guide wing 25*d*, and a friction protrusion 25*f* which protrudes on a side of an outer surface of the guide wing 25*d* by having a predetermined size and is in close contact with the fixed casing 11 such that friction force which resists the forward revolution of the drive roller 24 is adjusted.

Furthermore, according to the present disclosure, the drum control part 30 may include: a fixed shaft 31 which is mounted on a center of an outer part of the fixed casing 11 and supports the drum 3 such that the drum 3 is rotatable; a drum holder 32 which is rotatably mounted to the fixed shaft 31 and is inserted into and mounted to an end of the drum 3, the drum holder 32 being configured to be connected to the drive manipulation part 20 so as to receive forward rotational force; a cam cylinder 33 which is rotatably mounted between the fixed shaft 31 and the drum holder 32 and controls the drum holder 32 such that the drum holder 32 is held or rotated reversely when forward rotational force of the drive manipulation part 20 is blocked; a steel ball 34 which is disposed between the drum holder 32 and the cam cylinder 33 and is selectively engaged with the cam cylinder 33 by moving left and right while revolving around an outer surface of the cam cylinder 33 along the drum holder 32; a tightening spring 35 which is placed between the fixed shaft 31 and the cam cylinder 33 and changes in diameter according to the rotation of the cam cylinder 33 such that a reverse rotation of the cam cylinder 33 is prevented; and a holder cover 36 which is inserted into and mounted to a center of the drum holder 32 and prevents the fixed shaft 31 and the cam cylinder 33 from being removed from the drum holder 32.

Additionally, according to the present disclosure, the drum control part 30 may further include: a connecting shaft 37 being mounted to a center of an outer part of the fixed casing 11, the connecting shaft 37 being configured to induce mounting of a reducer preventing acceleration of the drum 3 to rotate the drum 3 at a predetermined speed or mounting of a coil spring rotating the drum 3 reversely to automatically wind the curtain fabric 2.

First, according to the present disclosure, the drive manipulation part which transmits a unidirectional rotational force to the drum control part is simply configured to have a one-stage clutch structure, thereby reducing labor required for manufacturing.

Second, according to the present disclosure, opposite ends of a roller protrusion part which allows radial inward and outward movements of the drive rollers to be performed while the roller protrusion part revolves the drive rollers are configured to be inclined, and thus the roller protrusion part pushes drive rollers such that the radial inward and outward movements of the drive rollers are performed according to the forward and reverse rotations of the drive rollers, thereby enabling precise power transmission between the drive guide and the drive rollers.

Third, according to the present disclosure, the roller teeth are formed on the outer surface of the drive connector which comes into close contact with the drive rollers, and the drive rollers are engaged with the roller teeth, thereby preventing slipping between the drive rollers and the drive connector.

Fourth, according to the present disclosure, the guide wing which comes into contact with the drive casing is formed on the outer surface of the drive guide, and a predetermined resistance is applied to forward revolutions of the drive rollers, thereby facilitating the radial inward movements of the drive rollers along the guide groove part.

In addition to the above-described effects, specific effects of the present disclosure will be described together while explaining specific details for carrying out the invention below.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
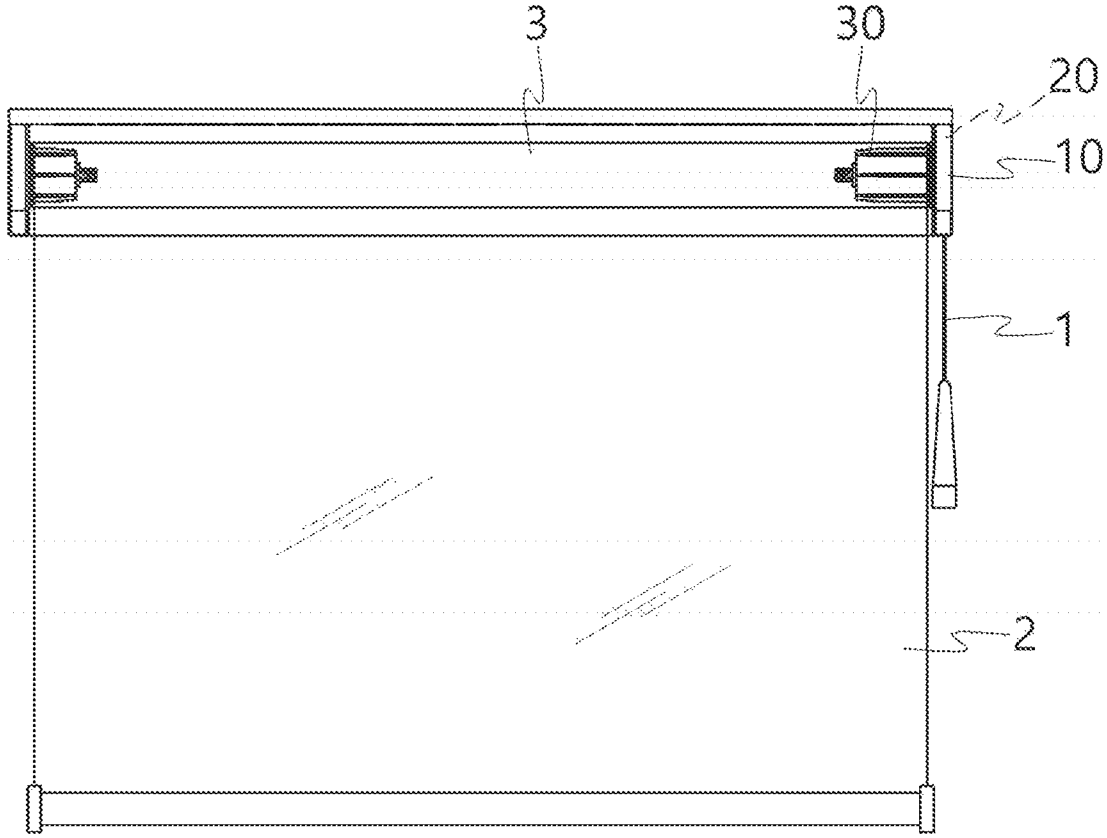
FIG. 1 is a front view illustrating a roller blind to which a drive device according to the present disclosure is applied.

Hereinafter, the embodiment of the present document will be described with reference to the accompanying drawings. However, this is not intended to limit the technology described in this document to a specific embodiment, and it should be understood that various modifications, equivalents, and/or alternatives of the embodiment of this document are included. In connection with the description of the drawings, like reference numerals may be used for like components.

In addition, expressions such as "first" and "second" used in this document may modify various elements regardless of order and/or importance, and are used only to distinguish one element from another element but do not limit the corresponding components. For example, "first part" and "second part" may represent different parts regardless of order or importance. For example, without departing from the scope of the claims described in this document, the first component may be named as the second component, and similarly, the second component may also be named as the first component.

In addition, terms used in this document are used only to describe a specific embodiment, and may not be intended to limit the scope of other embodiments. A singular expression may include a plural expression unless the context clearly dictates otherwise. Terms used herein, including technical or scientific terms, may have the same meanings as commonly understood by those skilled in the art described in this document. Among the terms used in this document, terms defined in a general dictionary may be interpreted to have the same or similar meaning as meaning in the context of the related art, and unless explicitly defined in this document, are not interpreted as deal or excessively formal meanings. In some cases, even terms defined in this document cannot be construed to exclude the embodiment of the present document.

Figure 2:
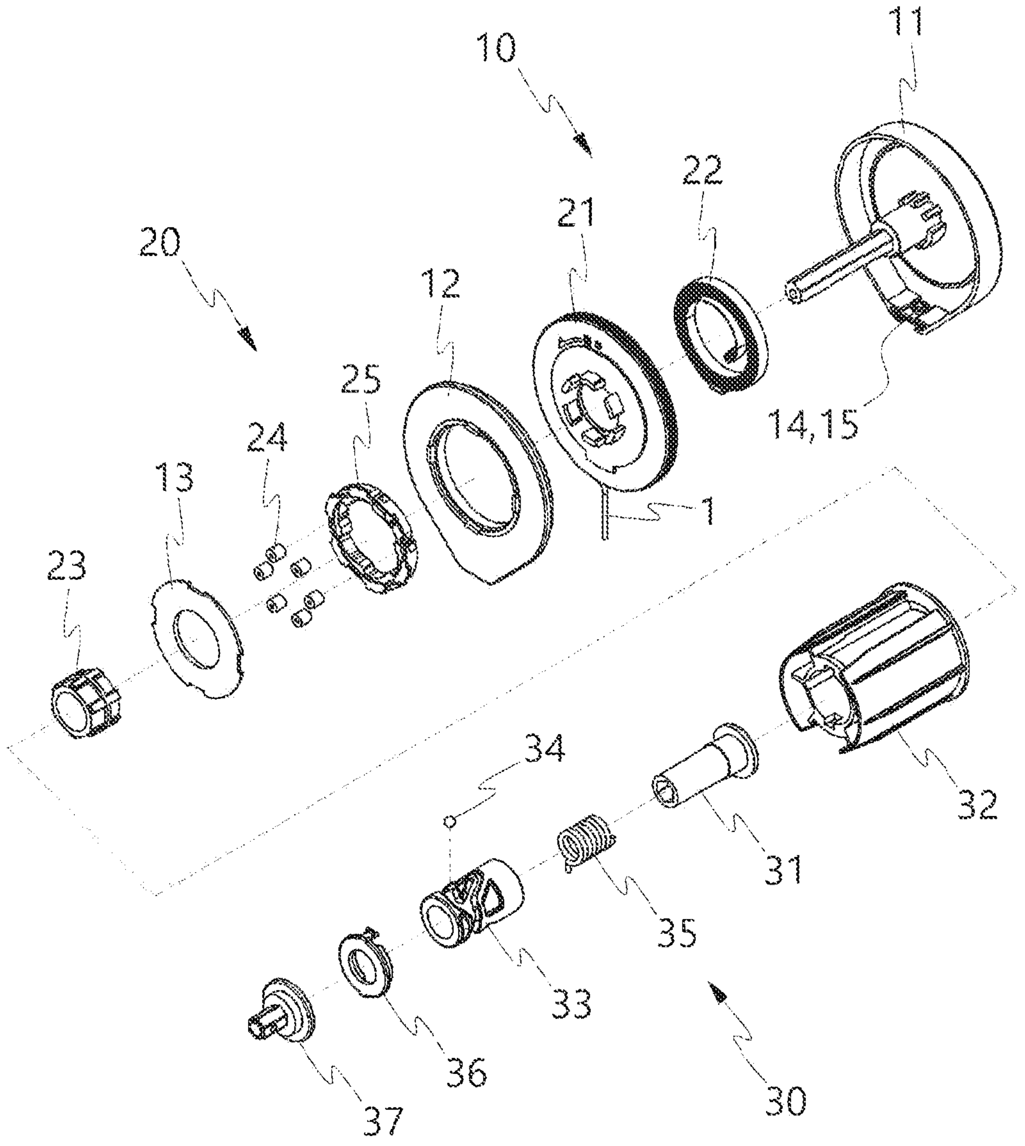
FIG. 2 is an exploded perspective view of the drive device according to the present disclosure.
Figure 3:
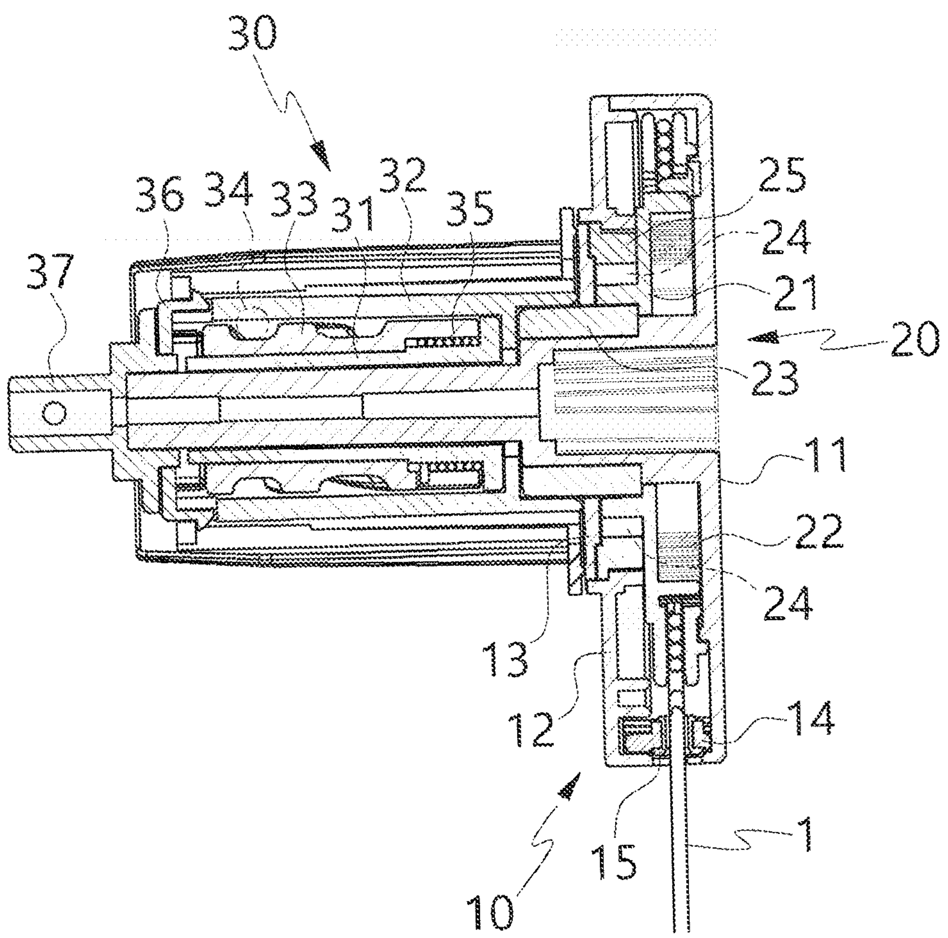
FIG. 3 is a sectional view illustrating the drive device by cutting the drive device from a front side according to the present disclosure.

As illustrated in FIG. 1, the present disclosure relates to a roller blind drive device in which a curtain fabric is lowered or raised by the forward/reverse rotation of a drum 3, on which a curtain fabric 2 is wound, performed only by a single pull cord 1. As illustrated in FIGS. 2 and 3, the present disclosure relates to a roller blind drive device operated by the single pull cord which includes a drive casing 10, a drive manipulation part 20, and a drum control part 30 as important components.

In this case, forward rotation mentioned in the present disclosure indicates a direction in which the drum 3 is rotated by the drive manipulation part 20 transmitting a rotational force to the drum control part 30 when the pull cord 1 is pulled down by a user.

That is, the drive device of the present disclosure may be configured such that the drum 3 is rotated clockwise or counterclockwise when the pull cord 1 is pulled down according to the method of lowering and raising the curtain fabric 2.

The method of lowering and raising the curtain fabric 2 will be described in detail together with the drum control part 30 to be described later.

Hereinafter, in order to help the understanding of the present disclosure, the description of the present disclosure will be limited to the drive device in which the drum 3 is rotated clockwise when the blind is viewed from the right side relative to FIG. 1 when the pull cord 1 is pulled down.

First, as illustrated in FIG. 1, the drive casing 10 according to the present disclosure is disposed at the right or left side of the blind and supports the drive manipulation part 20 and the drum control part 30 such that the drive manipulation part 20 and the drum control part 30 can rotate.

As illustrated in FIGS. 2 and 3, such a drive casing 10 includes a fixed casing 11, a casing cover 12, a closing cover 13, a passage cover 14, a protective sleeve 15.

The fixed casing 11 is fixedly mounted to the right side of the blind and supports the drive manipulation part 20 and the drum control part 30 such that the drive manipulation part 20 and the drum control part 30 can rotate.

The casing cover 12 is mounted to a side of the fixed casing 11 and restricts a drive wheel 21 and a drive spring 22 to be described later in the fixed casing 11 such that the drive wheel 21 and the drive spring 22 can rotate.

The closing cover 13 is mounted to a side of the casing cover 12 and restricts drive rollers 24 to be described later inside the fixed casing 11 such that the drive rollers 24 can revolve.

The passage cover 14 is inserted into and mounted to the lower side of the fixed casing 11, and covers a passage through which the pull cord 1 passes inside and outside of the fixed casing 11.

The protective sleeve 15 is inserted into and mounted to the center of the passage cover 14, and guides the pull cord 1 such that the pull cord 1 slidably moves inside and outside the fixed casing 11.

Figure 4:
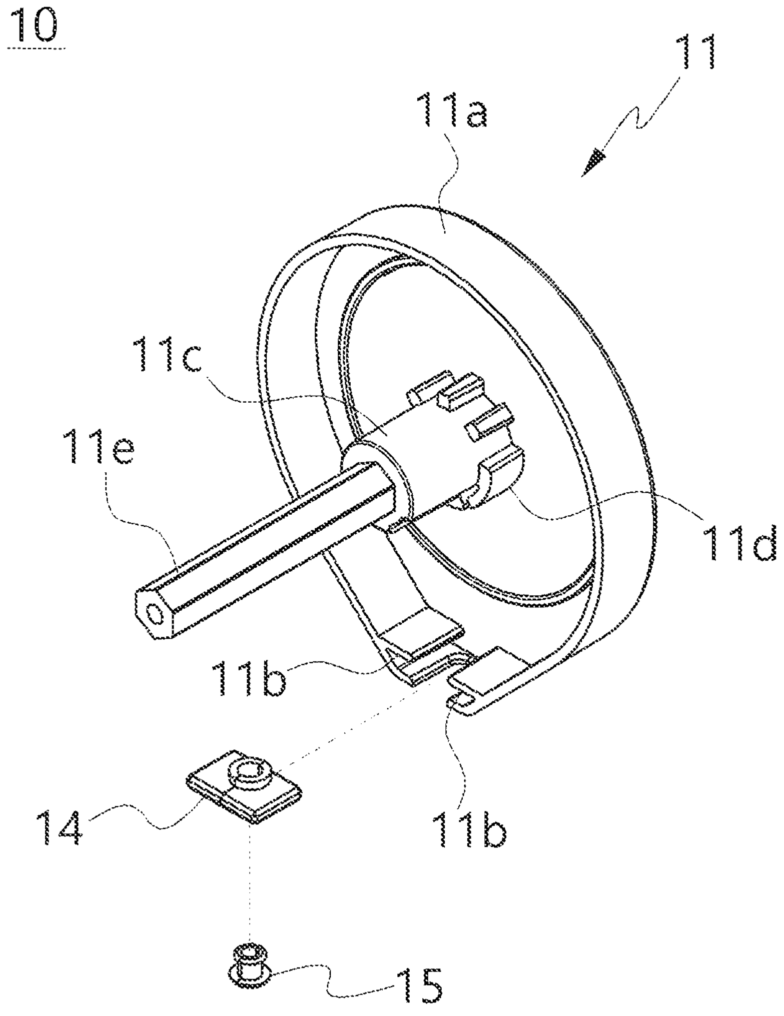
FIG. 4 is a perspective view illustrating a fixed casing in detail by enlarging the fixed casing according to the present disclosure.

In this case, as illustrated in FIG. 4, the fixed casing 11 includes a casing body 11*a*, a cover protrusion part 11*b*, a drive shaft 11*c*, a fixing protrusion part 11*d*, and a drum shaft 11*e* which are integrated with each other.

The casing body 11*a* is configured as a body having an open side surface which has space in which the drive manipulation part 20 can be received.

The passage having a predetermined size is formed on the lower end of such a casing body 11*a* such that the pull cord 1 wound on the drive wheel 21 passes inside and outside of the casing body.

The cover protrusion part 11*b* is formed by protruding on each of the opposite sides of the passage formed on the lower end of the casing body 11*a*, and is provided with a slot into the passage cover 14 is slidably inserted to be mounted to the cover protrusion part 11*b*.

The drive shaft 11*c* protrudes in a cylindrical shape at the center of the casing body 11*a*, and is inserted into the center of each of the drive wheel 21 and a drive connector 23 to be described later and supports the drive wheel 21 and the drive connector 23 such that the drive wheel 21 and the drive connector 23 can rotate.

The fixing protrusion part 11*d* protrudes on a side portion of the outer surface of the drive shaft 11*c*, and is coupled to and holds a first end of the drive spring 22 such that elastic energy is accumulated.

The drum shaft 11*e* protrudes on the center of the drive shaft 11*c* by having an angular shape and is inserted into the center of each of a fixed shaft 31 and a connecting shaft 37 to be described later so as to support a drum holder 32 such that the drum holder 32 can rotate.

Meanwhile, for convenience of assembly, each of the passage cover 14 and the protective sleeve 15 may be configured to be divided into opposite sides relative to a center thereof.

Next, the drive manipulation part 20 according to the present disclosure is rotatably mounted inside the drive casing 10 as illustrated in FIG. 1.

That is, the drive manipulation part 20 is connected to the pull cord 1 and transmits only forward rotational force generated by a user's pulling to the drum 3.

In addition, when a user's pulling is released, the pull cord 1 is wound to return to a raised position.

As illustrated in FIGS. 2 and 3, such a drive manipulation part 20 is composed of the drive wheel 21, the drive spring 22, the drive connector 23, the drive rollers 24, and a drive guide 25.

The drive wheel 21 is rotatably mounted to the drive shaft 11*c*, and the pull cord 1 is wound on the outer surface of the drive wheel 21 so as to receive forward rotational force from a user.

That is, when a user pulls the pull cord 1 down, the drive wheel 21 rotates clockwise when viewed from the right side relative to FIG. 3.

In addition, when a user releases the pull cord 1, the drive wheel 21 rotates counterclockwise due to the drive spring 22 when viewed from the right side.

Figure 5A:
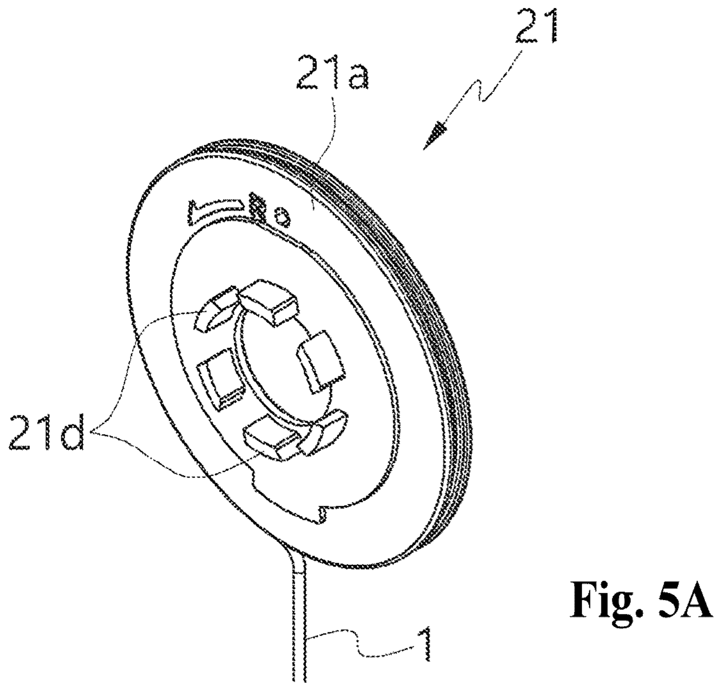
FIG. 5A is a perspective view illustrating a drive wheel in detail by enlarging the drive wheel according to the present disclosure.
Figure 5B:
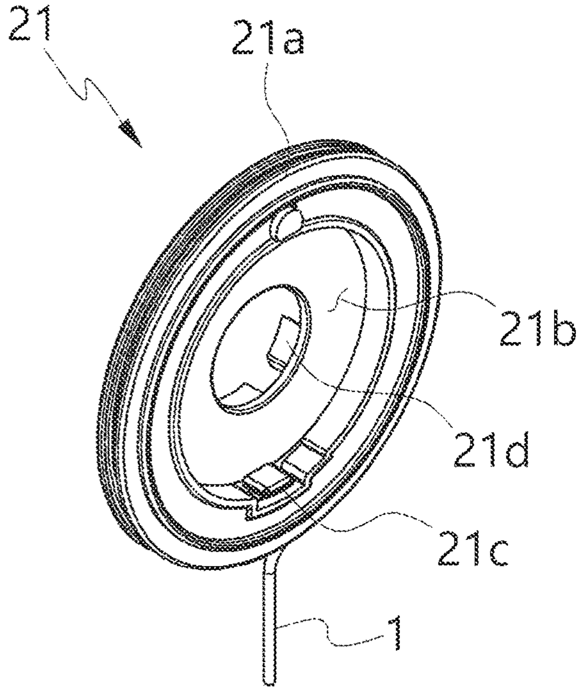
FIG. 5B is another perspective view illustrating the drive wheel in detail by enlarging the drive wheel according to the present disclosure.

Here, as illustrated in FIGS. 5A and 5B, the drive wheel 21 includes a drive wheel body 21*a*, a spring receiving recess 21*b*, a spring protrusion part 21*c*, and roller protrusion parts 21*d* which are integrated with each other.

The drive wheel body 21*a* is configured to have a disk shape by having an outer diameter to allow the drive wheel body 21*a* to be mounted in the fixed casing 11, and an inner diameter to allow the drive connector 23 to be received in the drive wheel body 21*a*.

The spring receiving recess 21*b* is recessed in the right side of the drive wheel body 21*a* by having predetermined diameter and depth and receives the drive spring 22.

The spring protrusion part 21*c* protrudes on one side of the spring receiving recess 21*b* and is coupled to and holds a second end of the drive spring 22 such that elastic energy is accumulated.

The roller protrusion parts 21*d* are disposed on the left side of the drive wheel body 21*a* by protruding therefrom to have arc shapes such that the roller protrusion parts 21*d* are disposed at intervals at which the drive rollers 24 are disposed therebetween while the roller protrusion parts 21*d* cover the outer surface of the drive connector 23.

Such roller protrusion parts 21*d* allow the drive rollers 24 to perform radial inward and outward movements while the roller protrusion parts 21*d* revolve the drive rollers 24 by operating in cooperation with the drive guide 25.

Figure 6A:
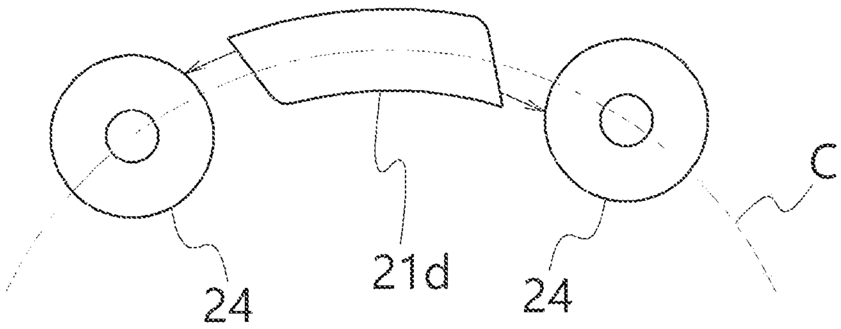
FIG. 6A is a side view illustrating a roller protrusion part in detail by enlarging the roller protrusion part according to the present disclosure.
Figure 6B:
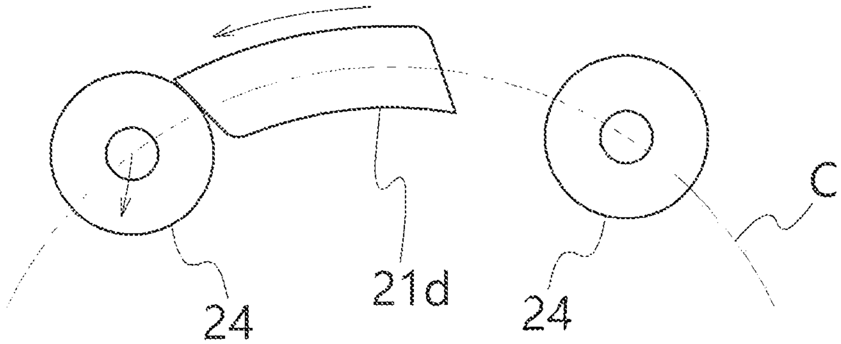
FIG. 6B is a side view illustrating the roller protrusion part, wherein the drive wheel rotates forward according to the present disclosure.
Figure 6C:
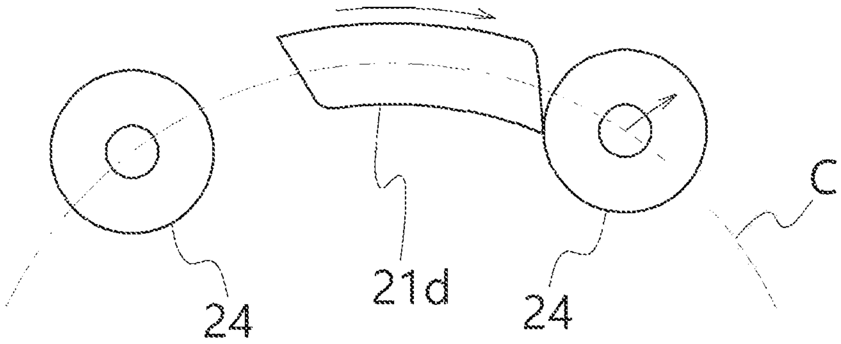
FIG. 6C is a side view illustrating the roller protrusion part, wherein the drive wheel rotates reversely according to the present disclosure.

Here, each of the opposite ends of each of the roller protrusion parts 21*d* is configured to be inclined at a predetermined angle, and revolves the drive rollers 24 and pushes the drive rollers 24 such that the radial inward and outward movements of the drive rollers 24 are performed as illustrated in FIGS. 6A, 6B, and 6C.

For reference, FIG. 6A is an enlarged view of the roller protrusion part 21*d* of FIG. 5A, FIG. 6B illustrates a case in which the drive wheel 21 rotates forward, and FIG. 6C illustrates a case in which the drive wheel 21 rotates reversely.

That is, the left end part of the roller protrusion part 21*d* directed in a forward rotational direction is configured to be inclined at an angle at which an outer portion of each of the drive rollers 24 relative to the center C of the drive roller 24 is in contact with the left end part of the roller protrusion part 21*d*.

In addition, the right end part of the roller protrusion part 21*d* directed in a reverse rotational direction is configured to be inclined at an angle at which an inner portion of each of the drive rollers 24 relative to the center C of the drive roller 24 is in contact with the right end part of the roller protrusion part 21*d*.

Figure 10:
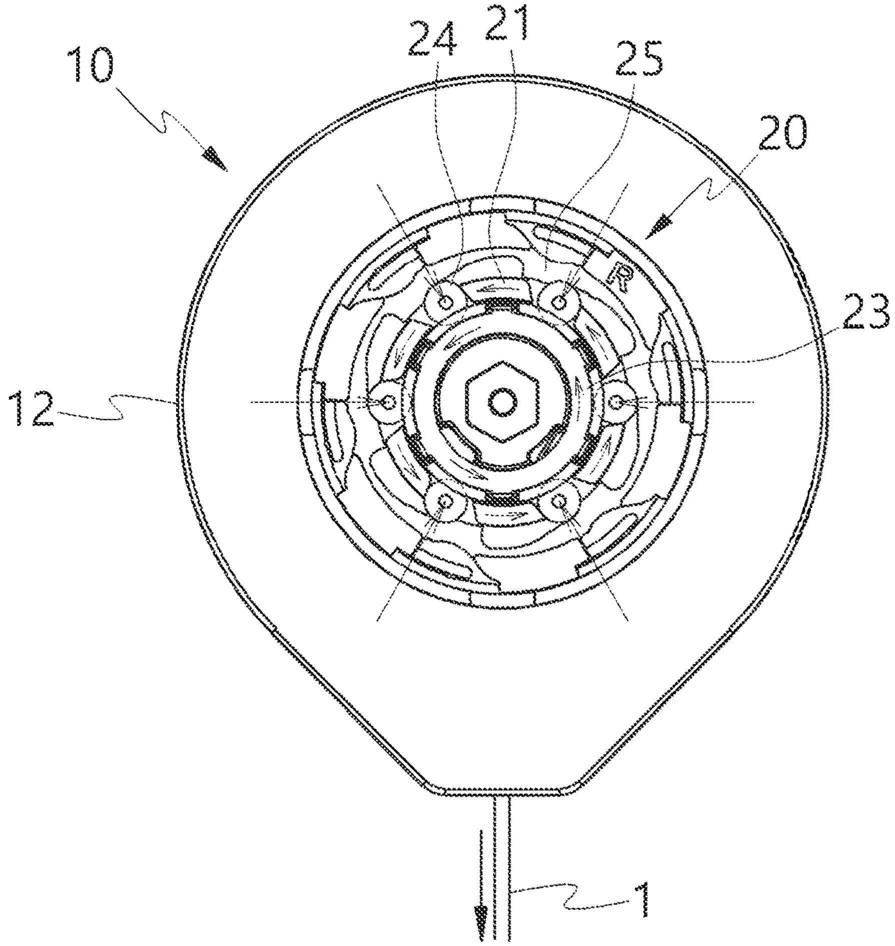
FIGS. 10 and 11 are side views illustrating the operation of a drive manipulation part according to the present disclosure.

Accordingly, when the drive wheel 21 is rotated clockwise by a user pulling the pull cord 1 down when viewed from the right side of the blind, the roller protrusion parts 21*d* press the drive rollers 24 as illustrated in FIG. 10 such that the drive rollers 24 move toward the drive connector 23. FIG. 10 illustrates a state of the drive wheel 21 viewed from the left side of the blind, and thus the drive wheel 21 is illustrated to rotate counterclockwise.

Figure 11:
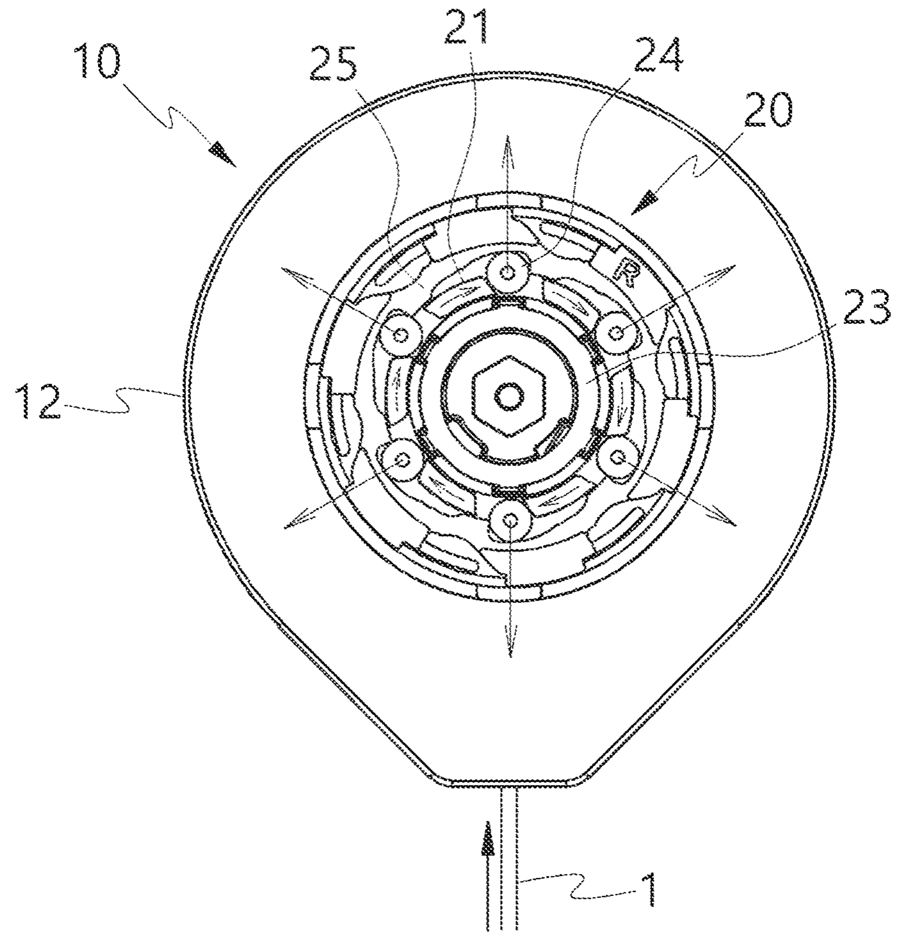

Contrarily, when the drive wheel 21 is rotated counterclockwise by a user releasing the pull cord 1 when viewed from the right side of the blind, the roller protrusion parts 21*d* raise the drive rollers 24 as illustrated in FIG. 11 such that the drive rollers 24 move outward from the drive connector 23. FIG. 11 illustrates a state of the drive wheel 21 viewed from the left side of the blind, and thus the drive wheel 21 is illustrated to rotate clockwise.

The drive spring 22 is inserted into and mounted in the spring receiving recess 21*b*, and the opposite ends of the drive spring 22 are coupled to the fixing protrusion part 11*d* and the spring protrusion part 21*c*, respectively.

That is, when the drive wheel 21 rotates clockwise by a user pulling the pull cord 1 down, the drive spring 22 accumulates elastic force by which the drive spring 22 is rotated counterclockwise.

Furthermore, when a user releases the pull cord 1, the elastic force accumulated in the drive spring 22 is applied to the drive wheel 21, and the drive wheel 21 is rotated counterclockwise when viewed at the right side of the blind.

Here, when the drive wheel 21 rotates counterclockwise, the pull cord 1 unwound from the drive wheel 21 is wound thereon and a handle connected to the end of the pull cord 1 is returned to a raised position.

Accordingly, even if a window is left open, the flapping of the pull cord 1 hanging down long as in a prior art is minimized.

The drive connector 23 is rotatably mounted to the drive shaft 11*c* and is connected to the drum holder 32 to be described later so as to transmit the forward rotational force of the drive wheel 21 thereto.

Figure 7:
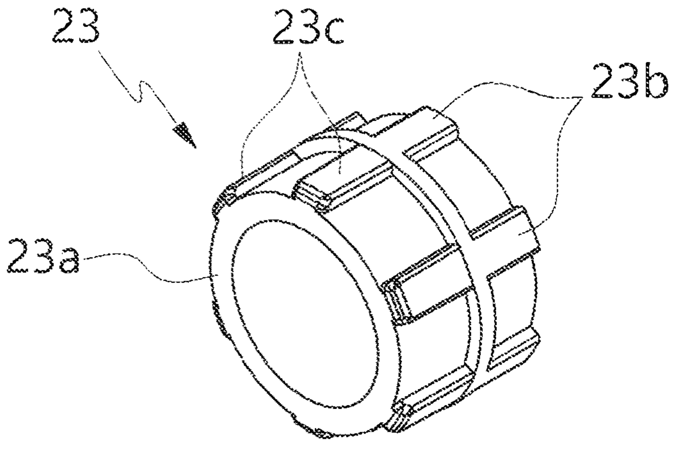
FIG. 7 is a perspective view illustrating a drive connector in detail by enlarging the drive connector according to the present disclosure.

As illustrated in FIG. 7, such a drive connector 23 includes a connector body 23*a*, roller teeth 23*b*, and connection teeth 23*c* which are integrated with each other.

The connector body 23*a* is configured to have a cylindrical shape having an inner diameter to receive the drive shaft 11*c* and an outer diameter for the connector body 23*a* to be inserted inside the roller protrusion parts 21*d* and into the drum holder 32.

The roller teeth 23*b* are disposed on the right outer surface of the connector body 23*a,* on which the drive wheel 21 is located, by protruding from the right outer surface at intervals at which the roller teeth 23*b* can be engaged with the drive rollers 24.

As illustrated in FIG. 10, these roller teeth 23*b* are engaged with the drive rollers 24 which come into close contact with the outer surface of these roller teeth 23*b* due to the radial inward movements of the drive rollers 24 such that slipping between the drive rollers 24 and the drive connector 23 is prevented.

The connection teeth 23*c* are disposed by protruding at predetermined intervals from the outer surface of the left side of the connector body 23*a* on which the drum holder 32 is located such that the connector body 23*a* is inserted into the drum holder 32 to be engaged therewith.

The drive rollers 24 are disposed radially between the outer surface of the drive connector 23 and the roller protrusion parts 21*d.*

Such drive rollers 24 revolve outside of the drive connector 23 according to the rotation of the drive wheel 21 and are selectively engaged with the drive connector 23 so as to transmit forward rotational force to the drive connector 23.

The drive guide 25 is mounted in the inner center of the drive casing 10 such that the drive guide 25 receives rotational resistance only for forward rotation thereof and rotates in forward and reverse directions.

That is, the drive guide 25 rotates along the drive rollers 24 and provides paths through which the drive rollers 24 radially move inward toward and outward from the drive connector 23.

Figure 8A:
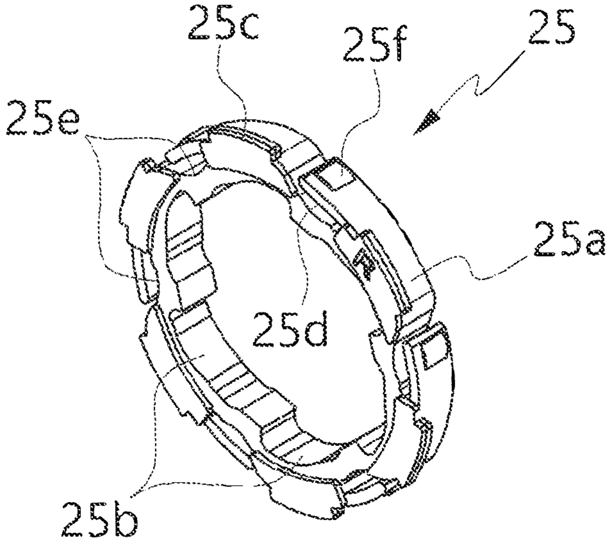
FIG. 8A is a perspective view illustrating a drive guide in detail by enlarging the drive guide according to the present disclosure.
Figure 8B:
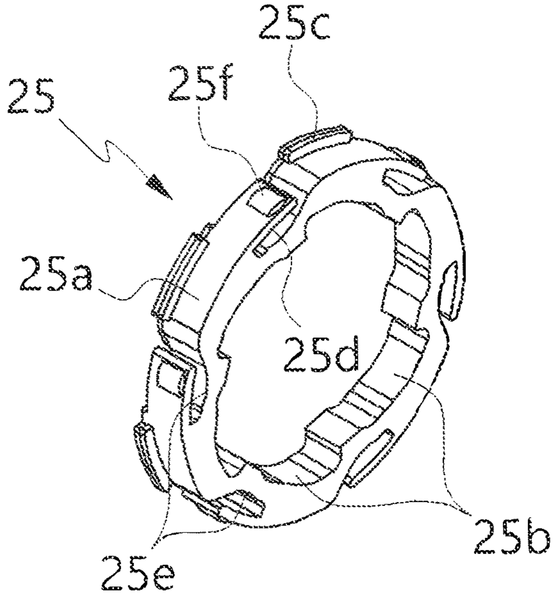
FIG. 8B is another perspective view illustrating the drive guide in detail by enlarging the drive guide according to the present disclosure.

As illustrated in FIGS. 8A and 8B, such a drive guide 25 includes a guide body 25*a,* a guide groove part 25*b,* a guide protrusion part 25*c,* and a guide wing 25*d* which are integrated with each other.

The guide body 25*a* is configured to have a ring shape by having an outer diameter such that the guide body 25*a* is mounted inside the fixed casing 11 and an inner diameter larger than a circumference on which the drive rollers 24 are arranged.

The guide groove part 25*b* is arranged to have a predetermined shape in the inner surface of the guide body 25*a* by being recessed therefrom according to the number of the arranged drive rollers 24.

Figure 9:
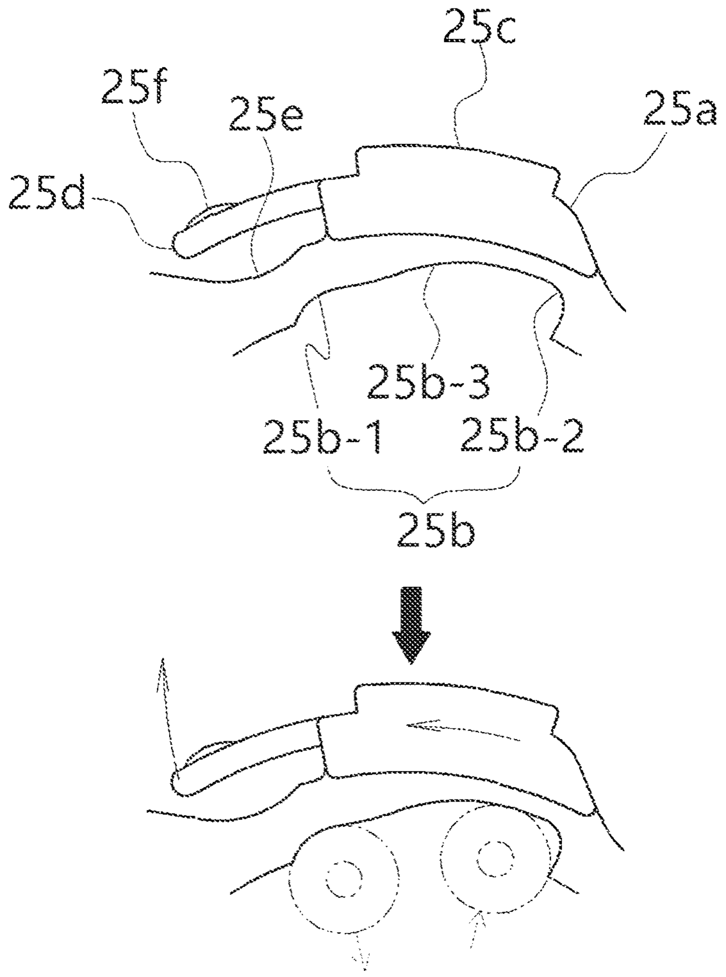
FIG. 9 is a side view illustrating an important part of the drive guide in detail by enlarging the important part of the drive guide according to the present disclosure.

That is, as illustrated in FIG. 9, the guide groove part 25*b* guides the drive rollers 24 such that the drive rollers 24 are moved radially inward toward or outward from the drive connector 23 according to the direction of the revolutions of the drive rollers 24.

Such a guide groove part 25*b* includes a pressing surface 25*b*-1, a spacing surface 25*b*-2, and a moving surface 25*b*-3.

The pressing surface 25*b*-1 is disposed at the left side of the guide groove part 25*b* directed in the forward rotational direction of the drive wheel 21, and is recessed to have a depth smaller than the radius of the drive roller 24.

The spacing surface 25*b*-2 is disposed at the right side of the guide groove part 25*b* directed in the reverse rotational direction of the drive wheel 21, and is recessed to have a depth greater than or equal to the radius of the drive roller 24.

The moving surface 25*b*-3 is recessed to have a tangential grade between the pressing surface 25*b*-1 and the spacing surface 25*b*-2 such that the drive roller 24 slides between the pressing surface 25*b*-1 and the spacing surface 25*b*-2.

That is, the pressing surface 25*b*-1 blocks the drive roller 24 revolving along the roller protrusion part 21*d* and changes the direction of the drive roller 24 such that the drive roller 24 presses the drive connector 23.

In addition, the spacing surface 25*b*-2 provides avoiding space such that the drive roller 24 is raised from the drive connector 23.

The guide protrusion part 25*c* is disposed on the left side surface of the guide body 25*a* by protruding outward therefrom such that the guide protrusion part 25*c* is stepped.

Such a guide protrusion part 25*c* is engaged with the casing cover 12 and supports the guide body 25*a* from the casing cover 12 such that the guide body 25*a* can rotate according to the revolutions of the drive rollers 24.

The guide wing 25*d* is disposed on the outer surface of the guide body 25*a* by protruding to have an arc shape in the forward rotational direction.

Here, the guide wing 25*d* protrudes from the guide body 25*a* by having an involute curve shape, and only an end portion of the guide wing 25*d* is in close contact with the inner surface of the casing cover 12.

That is, when the guide body 25*a* rotates forward while the guide wing 25*d* is in close contact with the inner surface of the casing cover 12, that is, when the guide body 25*a* rotates counterclockwise as illustrated in FIG. 9, a force by which the guide wing 25*d* is bent outward is generated.

Contrarily, in the reverse rotation of the guide body 25*a,* a force by which the guide wing 25*d* is bent inward is generated.

Accordingly, the guide wing 25*d* blocks the forward revolution of the drive roller 24 and allows the drive roller 24 to be forcibly introduced into the pressing surface 25*b*-1 from the spacing surface 25*b*-2.

In this case, the drive guide 25 may further include an avoidance groove part 25*e* and a friction protrusion 25*f.*

The avoidance groove part 25*e* is recessed to have a predetermined size in the outer surface of the guide body 25*a* facing the guide wing 25*d* and allows the bending of the guide wing 25*d.*

The friction protrusion 25*f* protrudes on a side of the outer surface of the guide wing 25*d* by having a predetermined size and is directly in close contact with the inner surface of the casing cover 12.

Such a friction protrusion 25*f* facilitates the adjustment of friction force that resists the forward revolutions of the drive rollers 24.

That is, when the friction force which resists the forward revolutions is excessively large, force to pull the pull cord 1 also increases, and noise and thermal deformation may occur during the revolutions of the drive rollers.

Accordingly, it is preferable that only friction force to allow the drive roller 24 to be introduced into the pressing surface 25*b*-1 from the spacing surface 25*b*-2 is generated.

However, since it is difficult to manufacture the guide wing 25*d* with a designed friction coefficient due to errors occurring in a manufacturing process, modification to the outer surface of the guide wing 25*d* or the inner surface of the casing cover 12 inevitably occurs as needed.

That is, when the friction protrusion 25*f* is formed on a side of the outer surface of the guide wing 25*d,* only the friction protrusion 25*f* having a relatively small size is required to be modified, so it is easy to manufacture the guide wing 25*d* with a desired friction coefficient.

Hereinafter, the operation process of the drive manipulation part 20 will be described with reference to FIGS. 10 and 11.

For reference, FIGS. 10 and 11 illustrates the fixed casing 11 and the drive manipulation part 20 viewed from the left side and thus unlike the above description, the forward rotation by the pull cord 1 is displayed in a counterclockwise direction.

That is, when a user pulls the pull cord 1 down by gripping the pull cord 1, a wound pull cord 1 is unwound and the drive wheel 21 is rotated counterclockwise as illustrated in FIG. 10.

While the drive rollers 24 revolve counterclockwise along the drive wheel 21, the drive rollers 24 radially move inward toward the outer surface of the drive connector 23 due to the drive guide 25.

Due to the radial inward movements of the drive rollers 24, the drive connector 23 and the drive rollers 24 are engaged with each other, and thus the drive connector 23 is also rotated counterclockwise according to the revolutions of the drive rollers 24.

Here, after the radial inward movements of the drive rollers 24, the drive guide 25 is also rotated counterclockwise along the drive rollers 24.

Accordingly, while the drum 3 mounted to the drum holder 32 is also rotated counterclockwise together with the drum holder 32 connected to the drive connector 23, the curtain fabric 2 is lowered.

In this case, when a user releases the pull cord 1 held by the user, the drive wheel 21 is rotated clockwise by the drive spring 22, and the unwound pull cord 1 is wound as illustrated in FIG. 11.

Here, while the drive rollers 24 revolve clockwise along the drive wheel 21, the drive rollers 24 radially move outward toward the outside of the drive connector 23.

With the radial outward movements of the drive rollers 24, the drive connector 23 and the drive rollers 24 are disengaged from each other, and the drive connector 23 is maintained to be stationary.

Likewise, after the radial outward movements of the drive rollers 24, the drive guide 25 rotates clockwise along the drive rollers 24.

Accordingly, the drive wheel 21 is disconnected from the drum holder 32, which does not impact the returning operation of the pull cord 1 and the reverse rotation of the drum holder 32.

Next, the drum control part 30 according to the present disclosure is mounted rotatably to the outer part of the drive casing 10 as illustrated in FIG. 1.

That is, the drum control part 30 receives a rotational force from the drive manipulation part 20 and rotates the drum 3 forward to lower the curtain fabric 2

In addition, when the rotational force of the drive manipulation part 20 is blocked, the drum 3 is held or is rotated reversely to automatically raise the curtain fabric 2.

As illustrated in FIGS. 2 and 3, such a drum control part 30 includes the fixed shaft 31, the drum holder 32, a cam cylinder 33, a steel ball 34, a tightening spring 35, a holder cover 36, and the connecting shaft 37.

The fixed shaft 31 is mounted over the drum shaft 11*e*, and supports the drum holder 32 such that the drum holder 32 can rotate.

The drum holder 32 is inserted into an end of the drum 3 so as to rotate therewith and is rotatably mounted to the fixed shaft 31.

A connector groove is formed in the center of a side of the drum holder 32 such that the drive connector 23 is inserted into the connector groove.

That is, the drum holder 32 is connected with the drive connector 23 and receives a forward rotational force from a user.

In addition, a steel ball groove is formed in the inner surface of the drum holder 32 by being recessed horizontally in a left-to-right direction such that the steel ball 34 is received in the steel ball groove such that the steel ball 34 can slide in left and right directions.

The cam cylinder 33 is rotatably mounted between the fixed shaft 31 and the drum holder 32.

That is, the cam cylinder 33 controls the drum holder 32 such that the drum holder 32 is held or rotated counterclockwise when clockwise rotational force is blocked from a user.

Here, a cut groove is formed in one end of the cam cylinder 33 such that an end part of the tightening spring 35 is coupled to the cut groove.

The steel ball 34 is disposed between the drum holder 32 and the cam cylinder 33 and is selectively engaged with the cam cylinder 33 while revolving around the outer surface of the cam cylinder 33 along the drum holder 32.

The tightening spring 35 is placed between the fixed shaft 31 and the cam cylinder 33 and changes in diameter according to the rotation of the cam cylinder 33 such that the reverse rotation of the cam cylinder 33 is prevented.

That is, when the drum holder 32 rotates clockwise, the tightening spring 35 rotates clockwise with the cam cylinder 33 on the fixed shaft 31.

In addition, when the drum holder 32 rotates counterclockwise, the tightening spring 35 presses the outer surface of the fixed shaft 31 and prevents the counterclockwise rotation of the cam cylinder 33.

The holder cover 36 is inserted into and mounted to the center of the drum holder 32 and prevents the fixed shaft 31 and the cam cylinder 33 from being removed from the drum holder 32.

The connecting shaft 37 is fixedly mounted to the drum shaft 11*e* and induces a reducer or a coil spring connected to the drum 3 to be fixedly mounted thereto.

In this case, a control groove having a predetermined pattern is formed in the outer surface of the cam cylinder 33 such that the steel ball 34 is selectively fitted into the control groove such that the drum holder 32 is held or is rotated counterclockwise.

Figure 12:
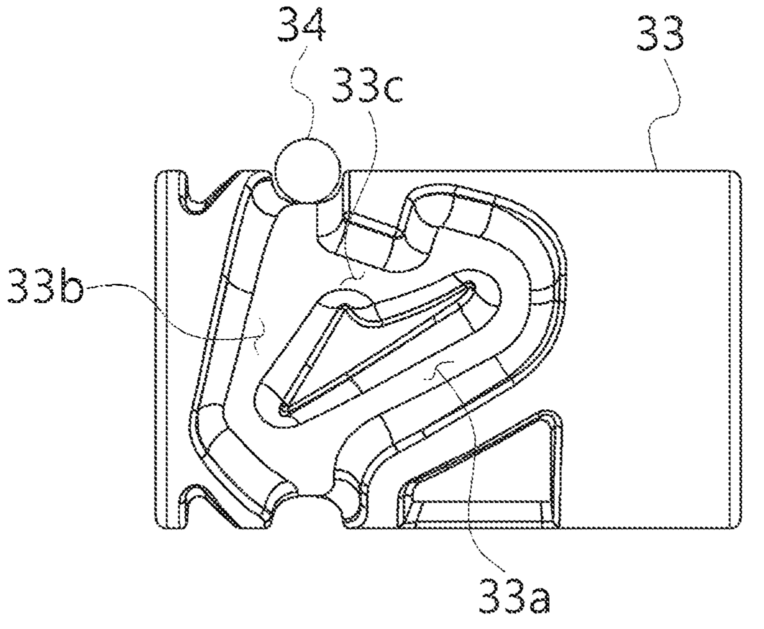
FIG. 12 is a top plan view illustrating an important part of a drum control part in detail by enlarging the important part of the drum control part according to the present disclosure.

As illustrated in FIG. 12, such a control groove may be formed by being divided into a holding groove 33*a*, a rotation groove 33*b*, and a transferring groove 33*c*.

The holding groove 33*a* is recessed to have a “?” shape on the right side of the outer surface of the cam cylinder 33 and restrains the steel ball 34 from revolving in clockwise and counterclockwise directions.

The rotation groove 33*b* is recessed to have a “<” shape from the lower side of the holding groove 33*a* on the left side of the outer surface of the cam cylinder 33 and allows the steel ball 34 to revolve counterclockwise.

The transferring groove 33*c* is recessed to have an “L” shape on the upper side of the holding groove 33*a* and the rotation groove 33*b* to communicate therewith and allows the steel ball 34 to escape from the holding groove 33*a* to the rotation groove 33*b*.

Figure 13A:
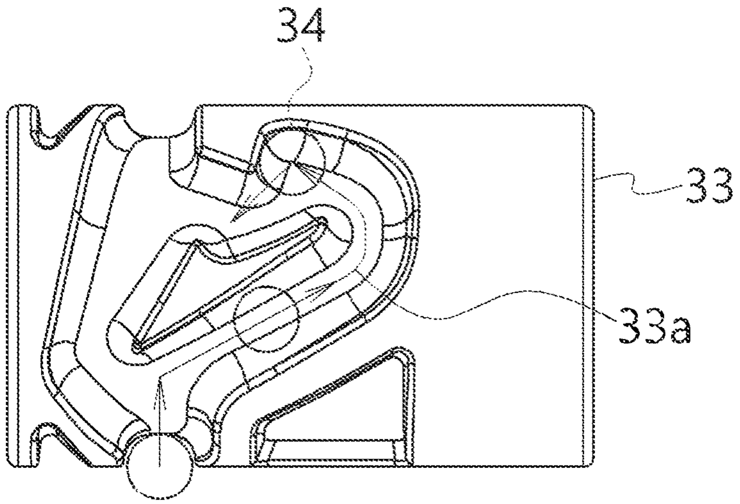
FIG. 13A is a top plan view illustrating the operation of the drum control part according to the present disclosure.
Figure 13B:
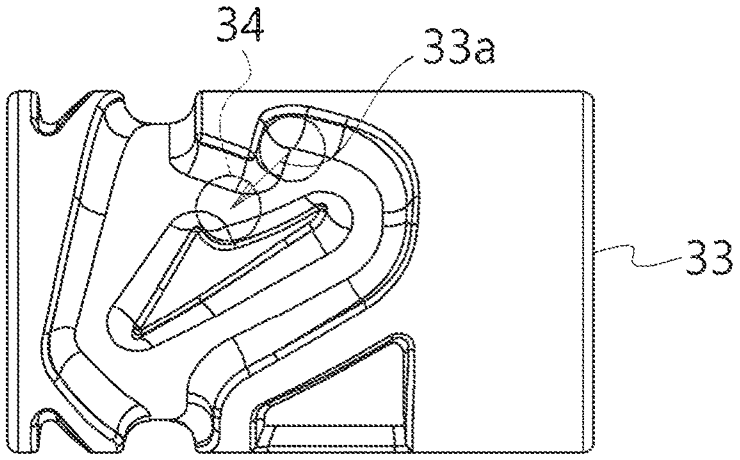
FIG. 13B is a top plan view further illustrating the operation of the drum control part according to the present disclosure.

That is, when a user pulls the pull cord 1 and the drum holder 32 rotates clockwise, the steel ball 34 is restrained by moving upward along the marked path of the holding groove 33*a* as illustrated in FIG. 13A In addition, when a user releases the pull cord 1, the drum holder 32 immediately rotates counterclockwise, and the steel ball 34 moves downward and is restrained as illustrated in FIG. 13B.

A reason for which the drum holder 32 rotates reversely will be described in the method of lowering and raising the curtain fabric 2 to be described later.

Figure 14A:
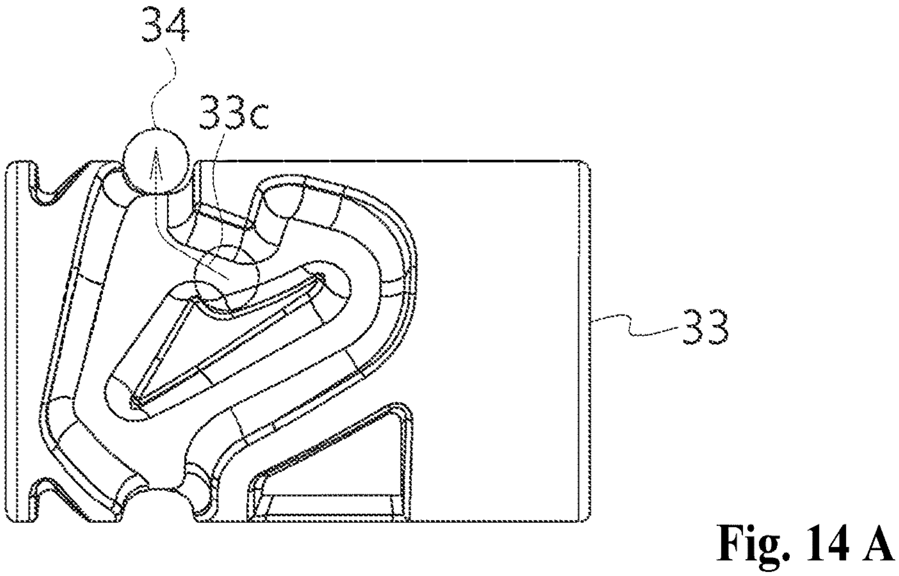
FIG. 14A is a top plan view illustrating another operation of the drum control part according to the present disclosure.

In this case, when a user pulls the pull cord 1 slightly and the drum holder 32 rotates clockwise, the steel ball 34 escapes to the upper side of the rotation groove 33*b* along the marked path of the transferring groove 33*c* as illustrated in FIG. 14A.

Figure 14B:
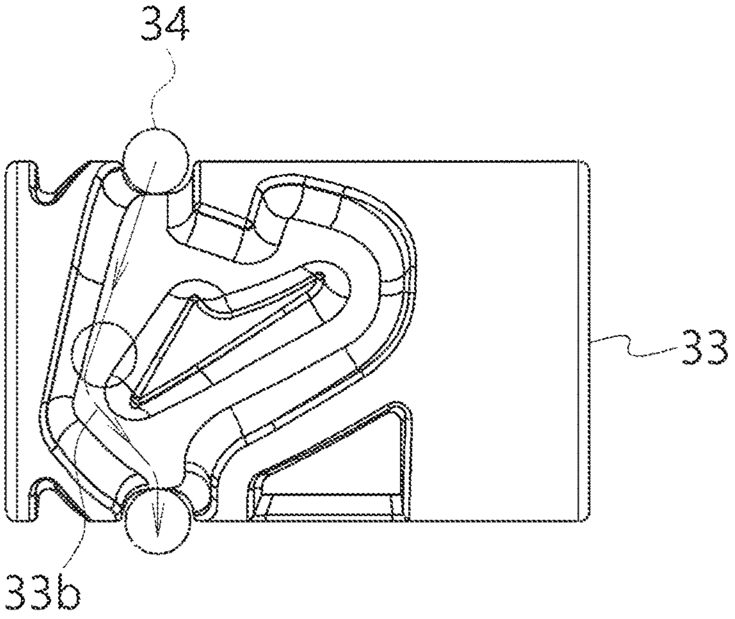
FIG. 14B is a top plan view further illustrating the operation of the drum control part according to the present disclosure.

When the steel ball 34 is located in the rotation groove 33*b,* the steel ball 34 continuously revolves from the lower side to the upper side and from the upper side to the lower side along the marked path of the rotation groove 33*b* as illustrated in FIG. 14B.

That is, the drum holder 32 continues to rotate counter-clockwise until the winding of the curtain fabric 2 is completed or until a user pulls the pull cord 1.

Meanwhile, the drive device of the present disclosure may be configured to be divided into a drive device of clockwise rotation and a drive device for counterclockwise rotation as described above.

That is, the drive device for clockwise rotation is applied to a method in which the curtain fabric 2 is manually lowered and automatically raised, and the drive device for counterclockwise rotation is applied to a method in which the curtain fabric 2 is automatically lowered and manually raised.

First, in the method of lowering manually and raising automatically the curtain fabric 2, the coil spring is mounted inside the drum 3 so as to wind up the curtain fabric 2 by rotating the drum 3 counterclockwise.

That is, when a user pulls the pull cord 1, the drum 3 rotates clockwise, and the curtain fabric 2 wound on the drum 3 is unwound as much as the pull cord 1 is pulled and moves down.

In addition, when a user releases the pull cord 1, the forward/reverse rotation of the drum 3 is blocked by the cam cylinder 33, and the curtain fabric 2 is held at a preset height.

Next, when a user pulls the pull cord 1 slightly and releases the pull cord 1, the drum 3 rotates counterclockwise by the coil spring, and the curtain fabric 2 is wound on the drum 3 and is automatically raised completely.

Second, in the method of lowering automatically and raising manually the curtain fabric 2, a weight is mounted on an end of the curtain fabric 2 such that the curtain fabric 2 is unwound down by rotating the drum 3 clockwise by gravity.

That is, when a user pulls the pull cord 1, the drum 3 rotates counterclockwise, and the curtain fabric 2 unwound on the drum 3 is wound up as much as the pull cord 1 is pulled.

Furthermore, when a user releases the pull cord 1, the forward/reverse rotation of the drum 3 is blocked by the cam cylinder 33, and the curtain fabric 2 is held at a preset height.

Next, when a user pulls the pull cord 1 slightly and releases the pull cord, the drum is rotated clockwise by the weight, and the curtain fabric is unwound on the drum and is automatically lowered completely.

In the above, the exemplary embodiment of the present disclosure has been illustrated and described, but the present disclosure is not limited to the specific embodiment described above. Various modifications of the embodiment may be made by those of ordinary skill in the technical field to which the invention belongs without departing from the gist of the present disclosure claimed in the claims. These modified embodiments should not be individually understood from the technical spirit or prospect of the present disclosure.

What is claimed is:

1. A roller blind drive device comprising:

a single pull cord; and a drum, wherein the single pull cord lowers or raises a curtain fabric by performing forward and/or reverse rotation of the drum, on which the curtain fabric is wound, by only the single pull cord;

a drive casing disposed fixedly on one side of the drum;

a drive manipulation part mounted rotatably inside the drive casing and connected with the single pull cord, wherein the drive manipulation part transmits only a forward rotational force generated by pulling the single pull cord to the drum and winds the single pull cord, wherein the single pull cord is returned to a raised position; and a drum control part mounted rotatably on an outer part of the drive casing and configured to receive the forward rotational force from the drive manipulation part and rotate the drum, the drum control part being configured to hold the drum or rotate the drum reversely when the forward rotational force of the drive manipulation part is blocked, wherein the drive manipulation part comprises:

a drive wheel which is mounted rotatably to an inner center of the drive casing, wherein the single pull cord is wound on the drive wheel and pulled by a user;

a drive spring which is located between the drive casing and the drive wheel to be connected and mounted thereto, the drive spring being configured to wind the single pull cord by rotating the drive wheel reversely;

a drive connector which is mounted rotatably to the inner center of the drive casing and is connected to the drum control part and transmits the forward rotational force of the drive wheel thereto;

a plurality of drive rollers which are disposed radially between the drive wheel and the drive connector and are selectively engaged with the drive connector while revolving outside of the drive connector along the drive wheel and transmits the forward rotational force to the drive connector; and a drive guide which receives forward rotational resistance and is rotatably mounted to the inner center of the drive casing, the drive guide being configured to guide each of the drive rollers which are radially moved inward and outward from the drive connector while the drive guide rotates along the drive rollers, wherein the drive connector comprises:

a connector body having an inner diameter which receives an inner center portion of the drive casing and having an outer diameter and a length with which the connector body is inserted into each of the drive wheel and the drum control part;

roller teeth being disposed on an outer surface of a first side of the connector body by protruding therefrom at intervals at which the roller teeth are engaged with the drive rollers preventing slipping between the drive rollers and the drive connector; and connection teeth being disposed on an outer surface of a second side of the connector body by protruding therefrom at predetermined intervals, wherein the drive connector is inserted into the drum control part to be engaged therewith.

2. The drive device of claim 1, wherein the drive casing comprises:

the fixed casing supporting the drive manipulation part and the drum control part, wherein the drive manipulation part and the drum control part are rotatable being supported by the fixed casing;

a casing cover which is mounted on one side of the fixed casing and restrains the drive manipulation part inside the fixed casing;

a closing cover which is mounted on one side of the casing cover and covers the casing cover, wherein the drive manipulation part is hidden by the closing cover;

a passage cover which is inserted into and mounted on a lower side of the fixed casing and covers the lower side of the fixed casing; and a protective sleeve which is inserted into and mounted to a center of the passage cover and guides the single pull cord.

3. The drive device of claim 2, wherein the fixed casing comprises:

a casing body having an open side surface which has space to receive the drive manipulation part therein and has a passage having a predetermined size provided on a lower side of the casing body;

a cover protrusion part which protrudes on each of lower opposite sides of the casing body and has a slot in which the passage cover is slidably inserted into and mounted;

a drive shaft which protrudes by a predetermined length on a center of the casing body and is inserted into and supports the drive manipulation part;

a spring protrusion part which protrudes on a side portion of an outer surface of the drive shaft, and induces a drive spring to be held in the spring protrusion part; and a drum shaft which protrudes by a predetermined length on a center of the drive shaft and is inserted into and supports the drum control part.

4. The drive device of claim 1, wherein the drive wheel comprises:

a drive wheel body having an outer diameter to be mounted in the drive casing and an inner diameter to receive the drive connector;

a spring receiving recess being recessed in a first side of the drive wheel body by having predetermined diameter and depth so as to receive the drive spring;

a spring protrusion part which protrudes on a side portion of the spring receiving recess and induces the drive spring to be held in the spring protrusion part; and roller protrusion parts respectively having arc shapes which are disposed on a second side of the drive wheel body by protruding therefrom, wherein the roller protrusion parts are disposed at intervals at which the drive rollers are disposed therebetween while the roller protrusion parts cover an outer surface of the drive connector, and with the roller protrusion parts the drive rollers perform radial inward and outward movements while the roller protrusion parts revolve the drive rollers.

5. The drive device of claim 4, wherein opposite ends of each of the roller protrusion parts are formed to be inclined respectively at predetermined angles, wherein the roller protrusion parts push the drive rollers so as to allow the drive rollers to be radially moved in inward and outward directions while the roller protrusion parts revolve the drive rollers.

6. The drive device of claim 5, wherein a first end of the roller protrusion part is configured to be inclined at a first angle at which an outer portion of the drive rollers relative to a center of the drive rollers is in contact with the first end of the roller protrusion part, wherein the drive rollers press the drive connector, and a second end of the roller protrusion part is configured to be inclined at a second angle at which an inner portion of the drive rollers relative to the center of the drive rollers is in contact with the second end of the roller protrusion part, wherein the drive rollers are raised outward from the drive connector.

7. The drive device of claim 1, wherein the drive guide comprises:

a guide body having an outer diameter with which the guide body is mounted inside the drive casing and an inner diameter larger than a circumference on which the drive rollers are arranged;

a guide groove part being arranged to have a predetermined shape in an inner surface of the guide body by being recessed therefrom according to a number of the arranged drive rollers, the guide groove part being configured to guide each of the drive rollers, wherein the drive rollers are radially moved inward or outward from the drive connector according to a direction of revolution of the drive rollers;

a guide protrusion part being disposed on a side surface of the guide body by protruding outward therefrom, the guide protrusion part being configured to be engaged with the drive casing and support the guide body, wherein the guide body is rotatable along the revolution of the drive rollers; and a guide wing being disposed on an outer surface of the guide body by protruding therefrom toward a forward rotational direction, the guide wing being configured to be in contact with the drive casing to apply a predetermined resistance to a forward revolution of the drive rollers and guide the drive rollers, wherein the drive rollers radially move inward along the guide groove part and toward the drive connector.

8. The drive device of claim 7, wherein the guide groove part comprises:

a pressing surface being recessed at a first side of the guide groove part directed in the forward rotational direction to have a depth smaller than a radius of the drive rollers, wherein the drive rollers press the drive connectors;

a spacing surface being recessed at a second side of the guide groove part directed in a reverse rotational direction to have a depth greater than or equal to the radius of the drive rollers, wherein the drive rollers are spaced apart outward from the drive connector; and a moving surface being recessed to have a tangential grade between the pressing surface and the spacing surface, wherein the drive rollers slide between the pressing surface and the spacing surface.

9. The drive device of claim 7, wherein the drive guide further comprises:

an avoidance groove part which is recessed to have a predetermined size in the outer surface of the guide body facing the guide wing and allows bending of the guide wing; and a friction protrusion which protrudes on a side of an outer surface of the guide wing by having a predetermined size and is in contact with a fixed casing, wherein friction force which resists the forward revolution of the drive rollers is adjusted by the friction protrusion.

10. The drive device of claim 1, wherein the drum control part comprises:

a fixed shaft which is mounted on a center of an outer part of a fixed casing and supports the drum;

a drum holder which is rotatably mounted to the fixed shaft and is inserted into and mounted to an end of the drum, the drum holder being configured to be connected to the drive manipulation part;

a cam cylinder which is rotatably mounted between the fixed shaft and the drum holder and controls the drum holder, wherein the drum holder is held or rotated reversely when the forward rotational force of the drive manipulation part is blocked;

a steel ball which is disposed between the drum holder and the cam cylinder and is selectively engaged with the cam cylinder by moving left and right while revolving around an outer surface of the cam cylinder along the drum holder;

a tightening spring which is placed between the fixed shaft and the cam cylinder and changes in diameter according to the rotation of the cam cylinder a reverse rotation of the cam cylinder is prevented by the tightening spring; and a holder cover which is inserted into and mounted to a center of the drum holder and prevents the fixed shaft and the cam cylinder from being removed from the drum holder.

11. The drive device of claim 10, wherein the drum control part further comprises:

a connecting shaft being mounted to a center of an outer part of the fixed casing, the connecting shaft being configured to induce mounting of a reducer preventing acceleration of the drum to rotate the drum at a predetermined speed or mounting of a coil spring rotating the drum reversely to automatically wind the curtain fabric.

12. A roller blind drive device comprising:

a single pull cord; and a drum, wherein the single pull cord lowers or raises a curtain fabric by performing forward and/or reverse rotation of the drum, on which the curtain fabric is wound, by only the single pull cord;

a drive casing disposed fixedly on one side of the drum;

a drive manipulation part mounted rotatably inside the drive casing and connected with the single pull cord, wherein the drive manipulation part transmits only a forward rotational force generated by pulling the single pull cord to the drum and winds the single pull cord, wherein the single pull cord is returned to a raised position; and a drum control part mounted rotatably on an outer part of the drive casing and configured to receive the forward rotational force from the drive manipulation part and rotate the drum, the drum control part being configured to hold the drum or rotate the drum reversely when the forward rotational force of the drive manipulation part is blocked, wherein the drive manipulation part comprises:

a drive wheel which is mounted rotatably to an inner center of the drive casing, wherein the single pull cord is wound on the drive wheel which receives the forward rotational force from a user;

a drive spring which is located between the drive casing and the drive wheel to be connected and mounted thereto, the drive spring being configured to wind the single pull cord by rotating the drive wheel reversely a drive connector which is mounted rotatably to the inner center of the drive casing and is connected to the drum control part and transmits the forward rotational force of the drive wheel thereto;

a drive rollers which are disposed radially between the drive wheel and the drive connector and are selectively engaged with the drive connector while revolving outside of the drive connector along the drive wheel and transmits the forward rotational force to the drive connector; and a drive guide which receives forward rotational resistance and is rotatably mounted to the inner center of the drive casing, the drive guide being configured to guide each of the drive rollers which are radially moved inward toward and outward from the drive connector while the drive guide rotates along the drive rollers, wherein the drive guide comprises:

a guide body having an outer diameter with which the guide body is mounted inside the drive casing and an inner diameter larger than a circumference on which the drive rollers are arranged;

a guide groove part being arranged to have a predetermined shape in an inner surface of the guide body by being recessed therefrom according to a number of the arranged drive rollers, the guide groove part being configured to guide each of the drive rollers, wherein the drive rollers are radially moved inward or outward from the drive connector according to a direction of revolution of the drive rollers;

a guide protrusion part being disposed on a side surface of the guide body by protruding outward therefrom, the guide protrusion part being configured to be engaged with the drive casing and support the guide body, wherein the guide body is rotatable along the revolution of the drive rollers; and a guide wing being disposed on an outer surface of the guide body by protruding therefrom toward a forward rotational direction, the guide wing being configured to be in contact with the drive casing to apply a predetermined resistance to a forward revolution of the drive rollers and guide the drive rollers, wherein the drive rollers radially move inward along the guide groove part and toward the drive connector.

13. The drive device of claim 12, wherein the guide groove part comprises:

a pressing surface being recessed at a first side of the guide groove part directed in the forward rotational direction to have a depth smaller than a radius of the drive rollers, wherein the drive rollers press the drive connectors;

a spacing surface being recessed at a second side of the guide groove part directed in a reverse rotational direction to have a depth greater than or equal to the radius of the drive rollers, wherein the drive rollers are spaced apart outward from the drive connector; and a moving surface being recessed to have a tangential grade between the pressing surface and the spacing surface, wherein the drive rollers slide between the pressing surface and the spacing surface.

14. The drive device of claim 12, wherein the drive guide further comprises:

an avoidance groove part which is recessed to have a predetermined size in the outer surface of the guide body facing the guide wing and allows bending of the guide wing; and a friction protrusion which protrudes on a side of an outer surface of the guide wing by having a predetermined size and is in contact with a fixed casing, wherein friction force which resists the forward revolution of the drive rollers is adjusted by the friction protrusion.

* * * * *